United States Patent
Matsuda et al.

(10) Patent No.: US 7,895,553 B2
(45) Date of Patent: Feb. 22, 2011

(54) VERIFICATION SUPPORT METHOD AND APPARATUS, AND COMPUTER PRODUCT

(75) Inventors: Akio Matsuda, Kawasaki (JP); Ryosuke Oishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 371 days.

(21) Appl. No.: 12/081,417

(22) Filed: Apr. 15, 2008

(65) Prior Publication Data
US 2008/0263485 A1 Oct. 23, 2008

(30) Foreign Application Priority Data
Apr. 17, 2007 (JP) ............... 2007-108429

(51) Int. Cl.
*G06F 17/50* (2006.01)
*G06F 9/455* (2006.01)
(52) U.S. Cl. ................. 716/106; 716/107
(58) Field of Classification Search .......... 716/45, 716/4, 5, 106, 107
See application file for complete search history.

(56) References Cited

U.S. PATENT DOCUMENTS

| | | | | |
|---|---|---|---|---|
| 5,727,143 A | * | 3/1998 | Morinaga | ............ 714/3 |
| 7,107,569 B2 | * | 9/2006 | Ito | ............ 716/18 |
| 7,681,159 B2 | * | 3/2010 | Matsuoka et al. | ............ 716/6 |
| 2002/0026623 A1 | * | 2/2002 | Morooka | ............ 716/8 |
| 2008/0016481 A1 | * | 1/2008 | Matsuoka et al. | ............ 716/6 |
| 2008/0024173 A1 | * | 1/2008 | Nagai et al. | ............ 327/20 |
| 2008/0066028 A1 | * | 3/2008 | Honma et al. | ............ 716/5 |

FOREIGN PATENT DOCUMENTS

JP 7-254008 10/1995

* cited by examiner

*Primary Examiner*—Jack Chiang
*Assistant Examiner*—Magid Y Dimyan
(74) *Attorney, Agent, or Firm*—Staas & Halsey LLP (57) ABSTRACT

A verification support apparatus that verifies operation of a circuit includes a receiving unit, a detecting unit, and a determining unit. The receiving unit receives implementation description data of the circuit. Based on the implementation description data, the detecting unit detects a functional block that is in the circuit and includes an external input terminal that receives an external input signal. Based on a detection result of the detecting unit, the determining unit determines the functional block to verify an abnormal-event operation. The abnormal-event operation is an operation that differs from an operation implementing a function of the circuit.

9 Claims, 8 Drawing Sheets

| VERIFICATION SUBJECT | NECESSITY OF EXCEPTION SCENARIO VERIFICATION | PORT TO WHICH EXCEPTION SCENARIO IS INPUT |
|---|---|---|
| FUNCTIONAL BLOCK A | NECESSARY | INPUT TERMINAL 1 |
| FUNCTIONAL BLOCK B | NOT NECESSARY | – |
| FUNCTIONAL BLOCK C | NECESSARY | INPUT TERMINAL 3 |

| VERIFICATION SUBJECT | EXCEPTION SCENARIO |
|---|---|
| FUNCTIONAL BLOCK A | FUNCTIONAL BLOCK A EXCEPTION SCENARIO 1 |
| FUNCTIONAL BLOCK C | FUNCTIONAL BLOCK C EXCEPTION SCENARIO 1 |
| FUNCTIONAL BLOCK C | FUNCTIONAL BLOCK C EXCEPTION SCENARIO 2 |

VERIFICATION SUPPORT METHOD AND APPARATUS, AND COMPUTER PRODUCT

CROSS-REFERENCE TO RELATED APPLICATIONS

This application is based upon and claims the benefit of priority from the prior Japanese Patent Application No. 2007-108429, filed on Apr. 17, 2007, the entire contents of which are incorporated herein by reference.

BACKGROUND OF THE INVENTION

1. Field of the Invention

The present invention relates to a technology of supporting logic verification of a circuit.

2. Description of the Related Art

In the design of large scale integration (LSI) circuits, logic verification to verify whether the LSI circuit operates correctly is essential. Particularly since larger-scale, higher-performance, faster speed, and lower-power consumption are demanded of LSI circuits, logic verification is important to maintain high quality. On the other hand, improved work efficiency by a reduction in the design period is demanded.

Generally, tests for logic verification of LSI circuits include a test to confirm operations for normal events (normal-event operations) and a test to confirm operations for abnormal events (abnormal-event operations). In the former (normal-event test), fundamental operations of the LSI circuit are confirmed using normal scenarios that implement LSI function. In the latter (abnormal-event test), abnormal-event operations of the LSI circuit are confirmed using exception scenarios that implement exception handling of the LSI.

Recently, various techniques of enhancing verification efficiency have been disclosed. For example, a technique is disclosed in which specification description and register transfer level (RTL) are correlated from a specification description of behavior level concerning a verification subject circuit and a description of the RTL corresponding to the specification description, and RTL test sequence data is generated based on a test sequence to verify the specification description (see, for example, Japanese Patent Application Laid-open Publication No. H07-254008).

According to the technique, an RTL test sequence derived from description modification and an expected value sequence are automatically generated, reducing the time required for test sequence generation that has been generated manually.

However, the abnormal-event test is not considered in the conventional technique disclosed in Japanese Patent Application Laid-open Publication No. H07-254008. In LSI logic verification, bugs typically occur more often in the abnormal-event test than in the normal-event test as fundamental LSI circuit operations confirmed in the normal-event test cause few bugs. Meanwhile, as units, ports, and combinations thereof subject to verification in the abnormal-event test are numerous, it is difficult to judge to what extent the operations should be verified, and unexpected bugs are likely to occur.

As a result, a verification engineer must verify the abnormal-event operations by trial and error, causing increased load on the verification engineer and prolonging the period required for verification.

SUMMARY OF THE INVENTION

It is an object of the present invention to at least solve the above problems in the conventional technologies.

A recording medium according to one aspect of the present invention stores therein a computer program for verifying operation of a circuit, wherein the computer program causes a computer to execute receiving implementation description data of the circuit; detecting, based on the implementation description data, a functional block that is in the circuit and includes an external input terminal that receives an external input signal; and determining, based on a detection result at the detecting, the functional block to verify an abnormal-event operation, the abnormal-event operation being an operation that differs from an operation implementing a function of the circuit.

A verification support apparatus according to another aspect of the present invention verifies operation of a circuit and includes a receiving unit that receives implementation description data of the circuit; a detecting unit that detects, based on the implementation description data, a functional block that is in the circuit and includes an external input terminal that receives an external input signal; and a determining unit that determines, based on a detection result of the detecting unit, the functional block to verify an abnormal-event operation, the abnormal-event operation being an operation that differs from an operation implementing a function of the circuit.

A verification support method of verifying operation of a circuit according to still another aspect of the present invention includes receiving implementation description data of the circuit; detecting, based on the implementation description data, a functional block that is in the circuit and includes an external input terminal that receives an external input signal; and determining, based on a detection result at the detecting, the functional block to verify an abnormal-event operation, the abnormal-event operation being an operation that differs from an operation implementing a function of the circuit.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Referring to the accompanying drawings, exemplary embodiments according to the present invention are explained in detail below.

Figure 1:
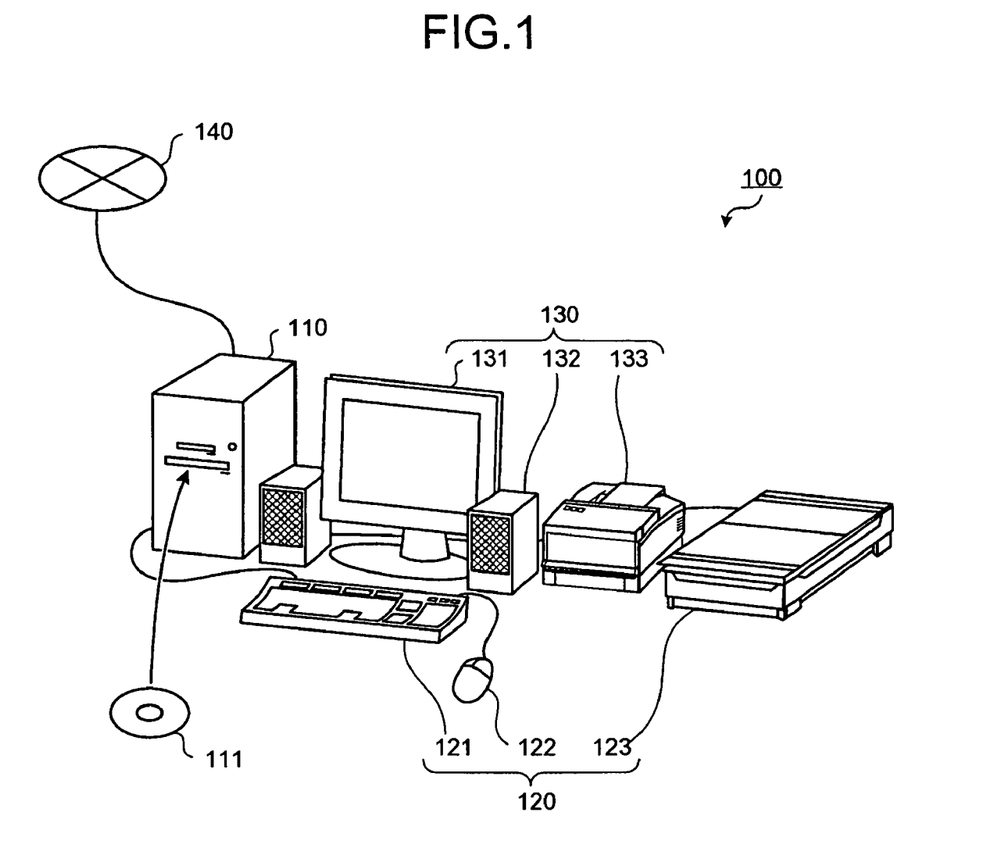
FIG. 1 is a schematic of a verification support apparatus according to an embodiment of the present invention.

FIG. 1 is a schematic of a verification support apparatus 100 according to an embodiment of the present invention. The verification support apparatus 100 includes a computer 110, an input device 120, and an output device 130, and can be connected to a network 140 such as an LAN, a WAN, and the Internet through a non-depicted router or a modem.

The computer 110 includes a CPU, a memory, and an interface. The CPU controls the entire verification support apparatus 100. The memory includes a read-only memory (ROM), a random access memory (RAM), a hard disk (HD), an optical disk 111, and a flash memory. The memory is used as a work area for the CPU.

Various programs are stored in the memory and loaded in response to a command from the CPU. The reading/writing data from/into the HD and the optical disk 111 is controlled by a disk drive. The optical disk 111 and the flash memory are removable. The interface controls input from the input device 120, output to the output device 130, and transmission/reception to/from the network 140.

The input device 120 includes a keyboard 121, a mouse 122, and a scanner 123. The keyboard 121 includes keys to input characters, numeric figures, various instructions, and the like, and inputs data. The keyboard 121 may be a touch panel type. The mouse 122 is used to move a cursor, select a range, move a window, or change a window size. The scanner 123 optically reads an image as image data, which is stored in the memory of the computer 110. The scanner 123 may have an optical character recognition (OCR) function.

As the output device 130, a display 131, a speaker 132, a printer 133, and others are adopted. The display 131 displays a cursor, an icon, and a tool box as well as data such as text, an image, and function information. The speaker 132 outputs sound such as a sound effect or a text-to-voice converted sound. The printer 133 prints image data or text data.

Figure 2:
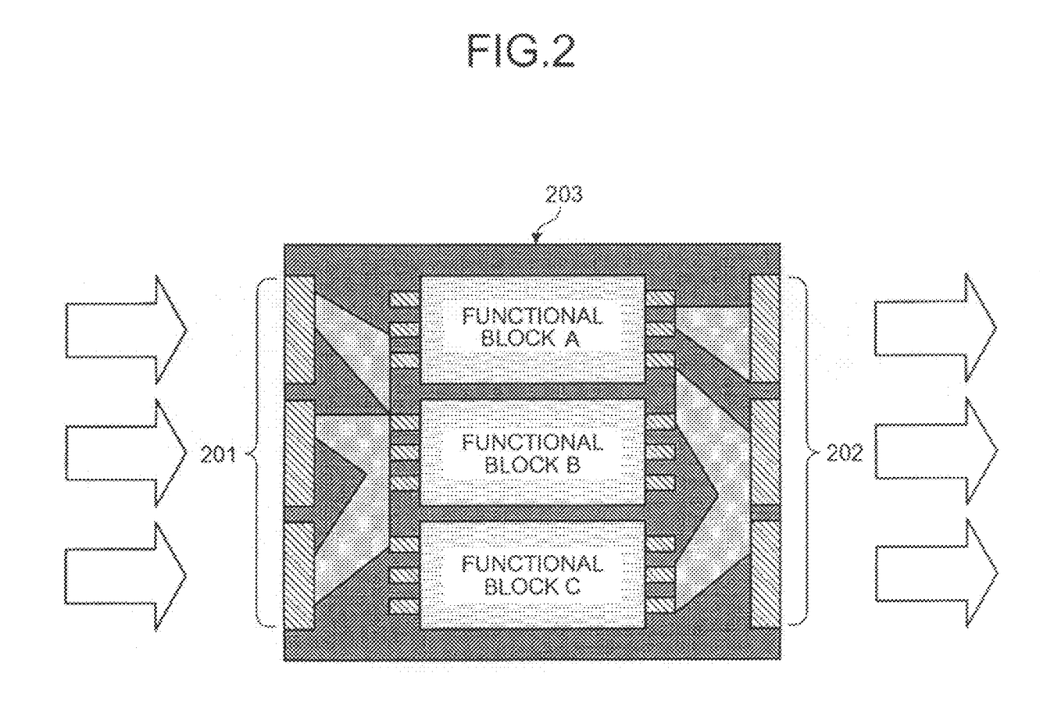
FIG. 2 is a schematic of a subject circuit.

FIG. 2 is a schematic of a circuit subject to verification. A subject circuit 200 is a digital circuit that includes register groups 201 and 202 having plural interface registers, and an internal logic 203 consisting of functional blocks A, B, and C.

Values corresponding to normal scenarios are set in the register group 201. When the normal scenarios are executed, values from the operations of the functional blocks A, B, and C are written into the register group 202 and also read therefrom.

Figure 3:
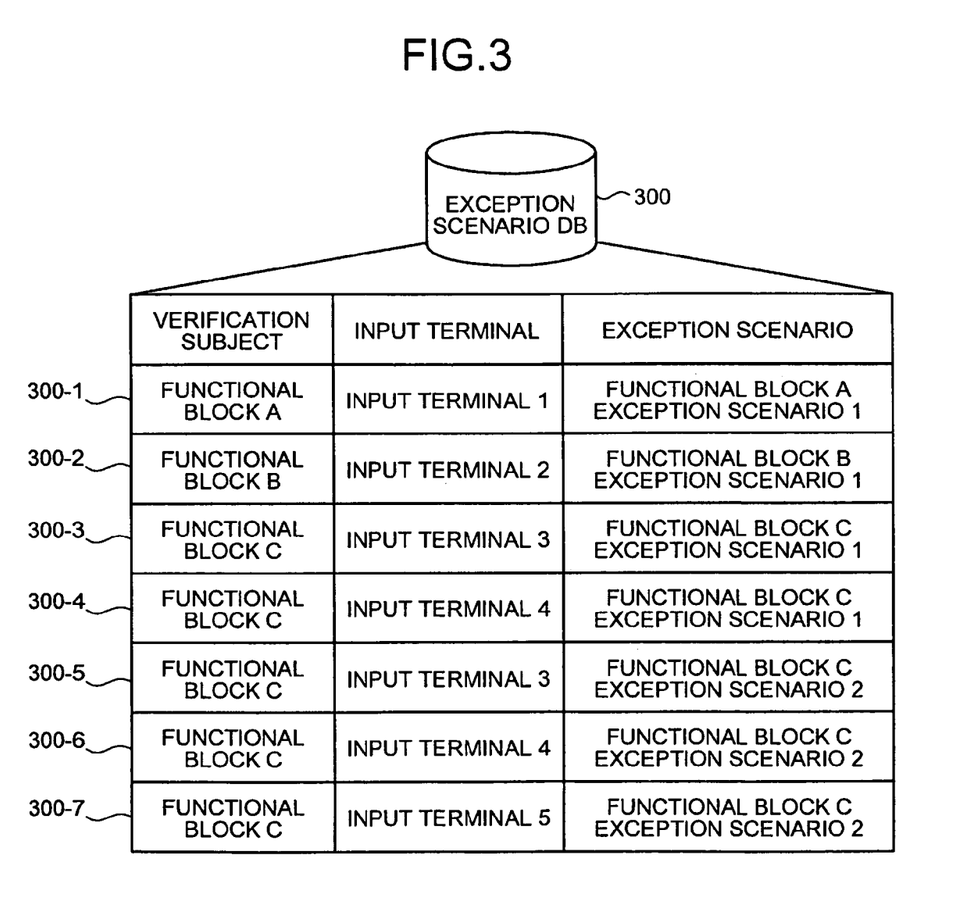
FIG. 3 is a schematic of an exception scenario information database (DB)

FIG. 3 is a schematic of an exception scenario information DB. As shown in FIG. 3, an exception scenario information DB 300 stores therein exception scenario information 300-1 to 300-7 for the functional blocks A to C subject to verification.

Specifically, the exception scenario information 300-1 to 300-7 includes exception scenarios to verify abnormal-event operations for each combination of the functional block A to C and input terminal 1 to 5 thereof. For example, the exception scenario information 300-1 includes the exception scenario "functional block A exception scenario 1" for the combination of the functional block A and the input terminal 1 thereof.

Further, the exception scenario information 300-2 includes the exception scenario "functional block B exception scenario 1" for the combination of the functional block B and the input terminal 2 thereof. The exception scenario information 300-3 includes the exception scenario "functional block C exception scenario 1" for the combination of the functional block C and the input terminal 3 thereof.

Figure 4:
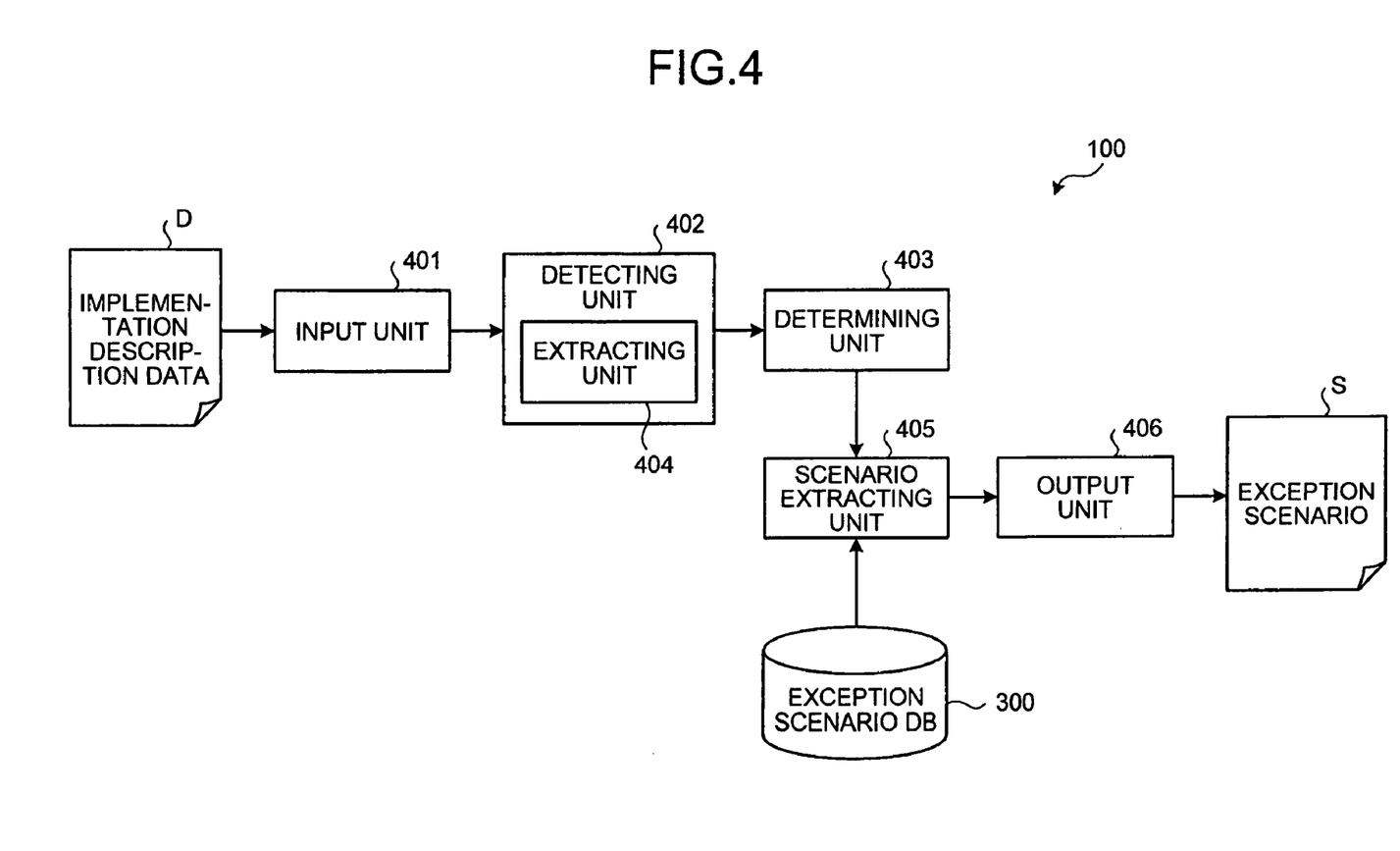
FIG. 4 is a block diagram of the verification support apparatus.

FIG. 4 is a block diagram of the verification support apparatus 100. As shown in FIG. 4, the verification support apparatus 100 includes the exception scenario information DB 300, an input unit 401, a detecting unit 402, a determining unit 403, an extracting unit 404, a scenario extracting unit 405, and an output unit 406.

Each function of the units 401 to 406 can be implemented by the CPU executing a corresponding program stored in the memory. Data output from each of the units 401 to 406 is stored in the memory. The connection destinations, indicated by the arrows in FIG. 4, read the data output by the connection sources from the memory, and the CPU executes a corresponding program.

Generally, the number of exception scenarios used for exception scenario verification to verify abnormal-event operations is enormous as the functional blocks and the input terminals thereof are numerous (e.g., on the order of 1 million). Therefore, it is difficult to reduce effectively the number of exception scenarios. The verification support apparatus 100 reduces the vast quantity of the exception scenarios to realize efficient logic verification.

The input unit 401 receives implementation description data D of the subject circuit 200. The implementation description data D includes description in hardware description language (HDL) of the RTL, and a netlist resulting from the logical synthesis thereof. For example, a user inputs the implementation description data D by operating the input device 120, such as the keyboard 121 or the mouse 122 shown in FIG. 1. The implementation description data D received by the input unit 401 is stored in the memory.

The detecting unit 402 detects, among the functional blocks A to C and based on the implementation description data D, a functional block having an input terminal that receives an external input signal, external with respect to the subject circuit 200, (hereinafter, "external input terminal").

Specifically, the detecting unit 402 reads the implementation description data D from the memory, judges the connections of the functional blocks A to C from the implementation description data D, and detects and stores, in the memory, a functional block having an external input terminal.

More specifically, the extracting unit 404 extracts an arbitrary functional block from the subject circuit 200 by referring to the implementation description data D that is retrieved from the memory. The detecting unit 402 detects an external input terminal in the extracted functional block. For example, the detecting unit 402 detects a description indicating an external input terminal by reading description contents concerning the extracted arbitrary functional block A to C in the implementation description data D.

Figure 5:
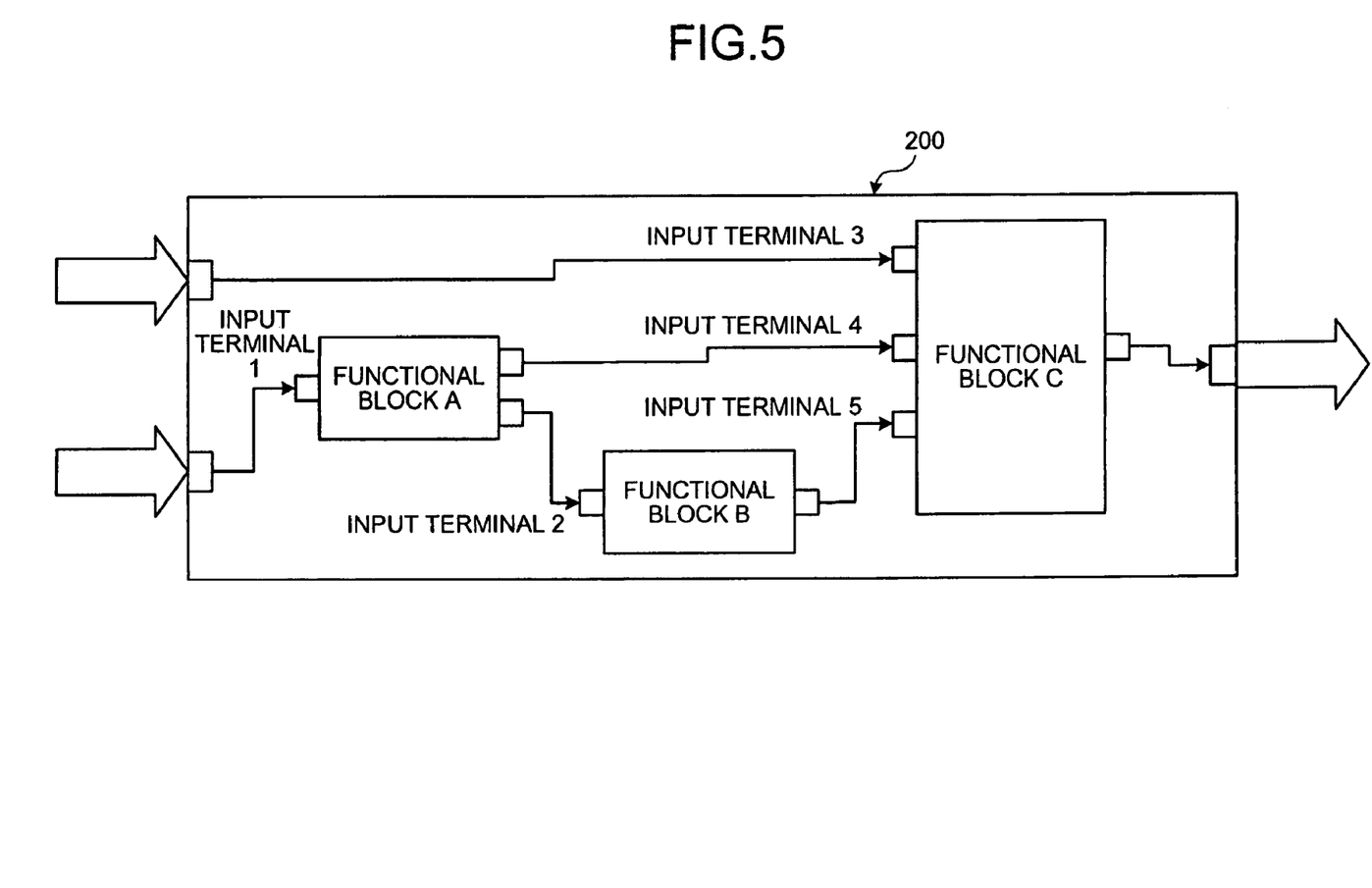
FIG. 5 is a schematic illustrating connections of functional blocks in the subject circuit.

FIG. 5 is a schematic illustrating connections of the functional blocks A to C. As shown in FIG. 5, the functional block A includes an input terminal 1, the functional block B includes an input terminal 2, and the functional block C includes input terminals 3, 4, and 5.

Among the input terminals, 1 to 5, the input terminals 1 and 3 are the external input terminals that receive an external input signal, while the input terminals 2, 4, and 5 are internal input terminals receiving an internal input signal from the functional blocks.

For example, with regard to the functional block C, the input terminal 3 is an external input terminal receiving an external input signal, the input terminals 4 and 5 are internal input terminals receiving input signals from the functional blocks A and B, respectively.

In the case shown in FIG. 5, the detecting unit 402 detects the functional block A having the input terminal 1 (an external input terminal) and the functional block C having the input terminal 3 (an external input terminal). More specifically, the extracting unit 404 sequentially extracts the functional blocks A to C, and the detecting unit 402 detects the external input terminals in the extracted functional blocks A to C.

Referring back to FIG. 4, the determining unit 403 determines, based on a detection result by the detecting unit 402, the functional block to verify abnormal-event operation of the subject circuit 200, i.e., operation that differs from the operation to be implemented by the subject circuit 200. The abnormal-event operation is, for example, exception handling executed by a functional block when an errant signal is input to the functional block.

The verification of abnormal-event operation is performed using an exception scenario that causes an abnormal-event operation by the subject circuit 200. The exception scenario is stored in the exception scenario information DB 300. In contrast, the verification of normal-event operation is performed using a normal scenario that causes a normal-event operation of the subject circuit 200.

Specifically, for example, the determining unit 403 reads the detection result of the detecting unit 402 from the memory, determines the functional block to verify abnormal-event operation by specifying a functional block that includes an external input terminal, and stores the determined functional block in the memory.

More specifically, when the detecting unit 402 detects an external input terminal in the arbitrary functional block extracted by the extracting unit 404, the determining unit 403 determines the arbitrary functional block as the functional block to verify abnormal-event operation. In the case shown in FIG. 5, the determining unit 403 determines the functional blocks A and C, which include external input terminals, as the functional blocks to verify abnormal-event operation.

Contents (abnormal-event operations) of the exception scenarios used for exception scenario verification are preliminarily set by a verification engineer, for example. However, since the number of the exception scenarios is great as explained above (seven information objects in the example shown in FIG. 3), it is necessary to effectively reduce the quantity of the exception scenarios according to verification priority.

Since the internal input terminal is less likely to receive an errant input signal than the external input terminal, high priority is set to the functional blocks A and C, which include external input terminals, and the exception scenario verification is performed only on the functional blocks A and C having high priority.

For example, unless an errant input signal is input to the input terminal 1 of the functional block A shown in FIG. 2, the possibility of an errant input signal being input to the input terminal 2 of the functional block B is low. Therefore, the exception scenario verification is performed only on the functional blocks having an external input terminal and a high possibility of the occurrence of a bug, thereby reducing useless exception scenario verification.

When the verification support method according to the embodiment is applied to perform logic verification on the subject circuit 200, the functions of the subject circuit 200 are assumed to be implemented correctly. Therefore, it is preferable that the normal scenario verification be executed for the subject circuit 200 prior to the execution of the exception scenario verification.

Figure 6:
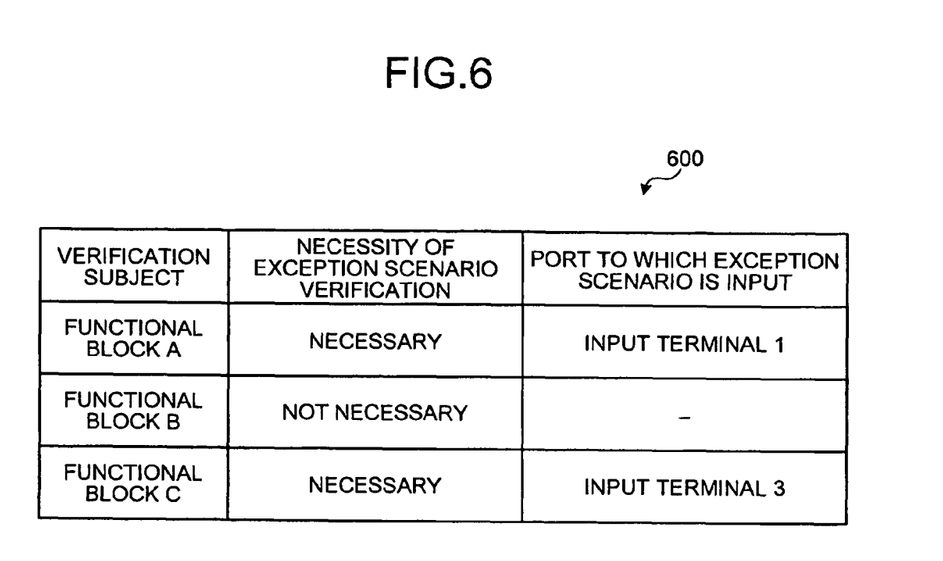
FIG. 6 is a schematic of a determination result.

FIG. 6 is a schematic of a determination result. The determination result 600 indicates the necessity of exception scenario verification for each of the functional blocks A to C.

Specifically, the necessity of exception scenario verification is indicated for the combinations of the functional block A to C and the corresponding input terminal 1 to 5 thereof. For example, the exception scenario verification is necessary for the functional block A, which includes input terminal 1 (an external input terminal).

As the functional block B includes no external input terminal, the exception scenario verification is not necessary. However, the exception scenario verification is necessary for the functional block C, which includes the input terminal 3 (an external input terminal).

The output unit 406 explained hereinafter may output the determination result 600. A verification engineer can judge, by checking the determination result 600, which combination of functional block and corresponding input terminal requires the exception scenario verification.

The scenario extracting unit 405, from a pool of exception scenario information to verify abnormal-event operation of the functional blocks A to C, extracts exception scenario information S for the functional block determined by the determining unit 403. For example, the pool of exception scenario information corresponds to the exception scenario information DB 300 shown in FIG. 3.

Specifically, for example, the scenario extracting unit 405 reads the determination result 600 from the memory and by referring to the determination result 600, extracts from the exception scenario information DB 300, the exception scenario information 300-1 corresponding to the functional block A and the exception scenario information 300-3 to 300-7 corresponding to the functional block C. The scenario extracting unit 405 stores the extracted exception scenario information in the memory.

Thus, by limiting the exception scenario verification to the functional blocks that include an external input terminal and have a high potential for a bug to occur, the number of exception scenarios concerning the subject circuit 200 can be reduced from seven in FIG. 3 to six (the exception scenario information 300-1 and 300-3 to 300-7).

The scenario extracting unit 405 extracts, from the pool of exception scenario information, the exception scenario information S corresponding to the external input terminal of the functional block determined by the determining unit 403. Specifically, for example, the scenario extracting unit 405 reads the determination result 600 from the memory, and by referring to the combinations of external input terminals and functional blocks requiring exception scenario verification, extracts the exception scenario information 300-1, 300-3, and 300-5 and stores the extracted exception scenario information in the memory.

Thus, by limiting narrowing down the subjects for the exception scenario verification not only according to the functional blocks that include the external input terminals, but also according to the external input terminals, the number of exception scenarios can be reduced from six information objects (the exception scenario information 300-1 and 300-3 to 300-7) to three (the exception scenario information 300-1, 300-3, and 300-5).

Although the exception scenario information 300-1 to 300-7 is assumed to be preliminarily stored in the exception scenario information DB 300 in the embodiment, the exception scenario information 300-1 to 300-7 may be directly input to the verification support apparatus 100, or acquired from an external computer device via the network 140. Specifically, for example, a use case scenario describing operation specification of the subject circuit 200 is input to the verification support apparatus 100 to acquire an exception scenario defined in the use case scenario.

The output unit 406 outputs the exception scenario information S extracted by the scenario extracting unit 405. Specifically, the output unit 406 reads the exception scenario information S from the memory and outputs the exception scenario information S.

The exception scenario information S output by the output unit 406 may be displayed on the display 131, printed out by the printer 133, stored in the memory, or transmitted to an external device.

Figure 7:
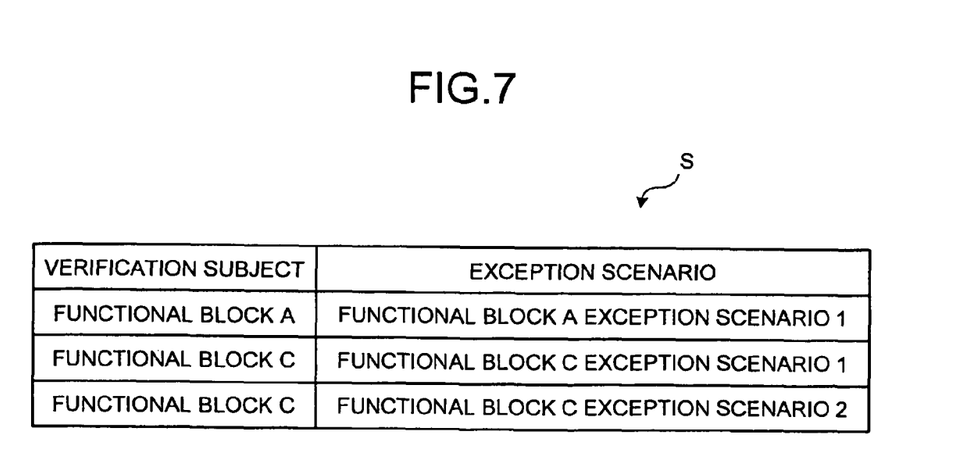
FIG. 7 is a schematic of exception scenario information.

FIG. 7 is a schematic of the exception scenario information S. The exception scenario information S includes, according to the functional block targeted for the exception scenario verification, exception scenarios used for the exception scenario verification. Specifically, the exception scenario information S includes an exception scenario corresponding to the functional block A of "functional block A exception scenario 1," an exception scenario corresponding to the functional block C of "functional block C exception scenario 1," and an exception scenario corresponding to the functional block C of "functional block C exception scenario 2."

The exception scenario verification is performed using the exception scenario information S. Therefore, without the loss of exception scenarios for which the exception scenario verification must be performed, the exception scenarios not used for the exception scenario verification can be deleted, thereby enabling a reduction of the number of exception scenarios and achieving effective logic verification.

Although the functional blocks including external input terminals are determined as the subjects of the exception scenario verification according to the embodiment, a universal subset may be determined as the subject of the exception scenario verification.

Figure 8:
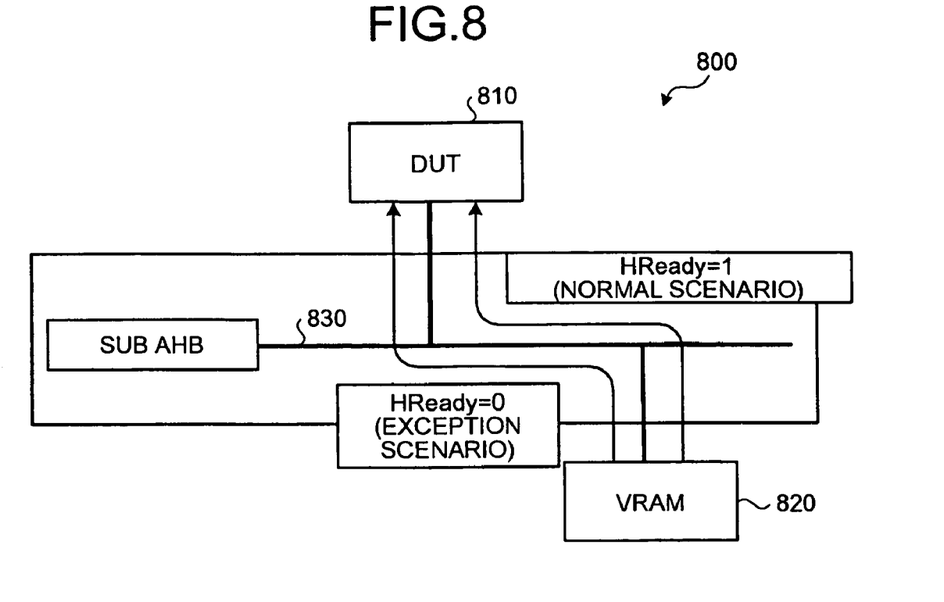
FIG. 8 is a schematic of a subset.

FIG. 8 is a schematic of a subset. A subset 800 includes a device under test (DUT) 810 and a video random access memory (VRAM) 820 that are connected via a bus 830.

A normal scenario to verify a normal-event operation of the subset 800 enables access of the VRAM 820 from the DUT 810 to enable the reading and writing of data from/to the VRAM 820, when "HReady=1" ("HReady" being the name of a signal).

When plural destinations accessed by the DUT 810 are included in the subset 800, an unintended operation is expected and when "HReady=0," an exception scenario to verify an abnormal-event operation of the subset 800 must disable access of the VRAM 820 from the DUT 810.

However, according to the subset 800, the only access destination from the DUT 810 is the VRAM 820. Therefore, an exception scenario is provided that enables the DUT 810 to access the VRAM 820 to enable the reading and writing of data even when "HReady=0." In other words, similar to the functional block including the external input terminal, a subset (functional block) that can be utilized under various specifications, such as the subset 800, is determined as the subject of the exception scenario verification.

As a result, even when a subject circuit includes a universal functional block such as the subset 800, the number of exception scenarios can be reduced without excluding necessary exception scenarios, thereby achieving effective logic verification.

Figure 9:
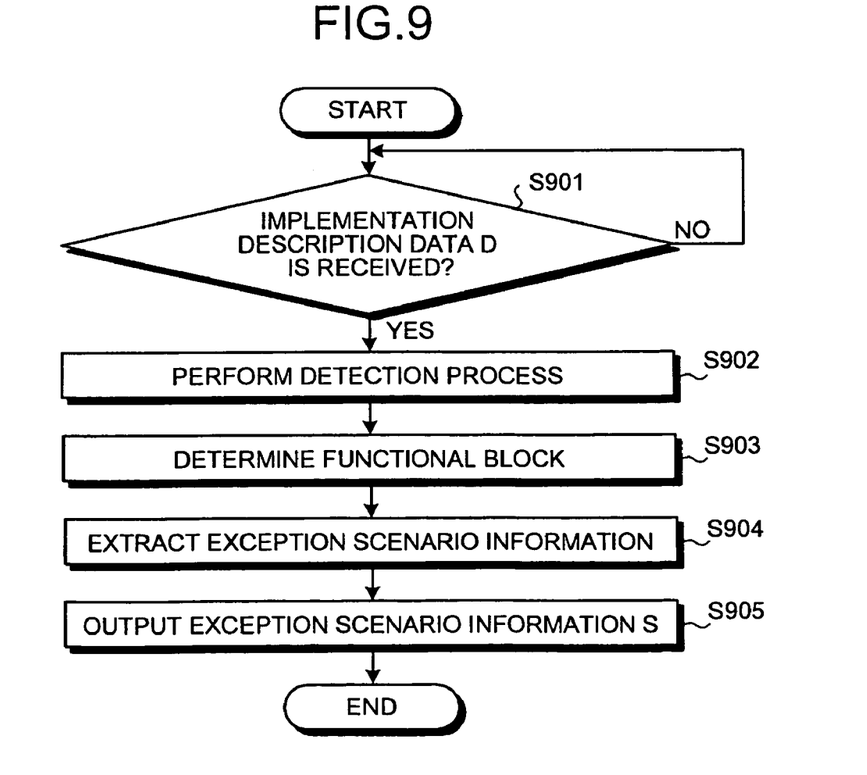
FIG. 9 is a flowchart of a verification support process performed by the verification support apparatus.

FIG. 9 is a flowchart of a verification support process performed by the verification support apparatus 100. As shown in FIG. 9, it is judged whether the input unit 401 receives the implementation description data D (step S901). When the input unit 401 receives the implementation description data D (step S901: YES), the detecting unit 402 detects, based on the implementation description data D, a functional block including an external input terminal from among the functional blocks A to C (step S902).

The determining unit 403 determines the functional block to verify an abnormal-event operation of the subject circuit 200 based on the detection result at step S902 (step S903). The scenario extracting unit 405 extracts exception scenario information corresponding to the functional block determined at step S903 from the exception scenario information DB 300 (step S904).

The output unit 406 outputs the exception scenario information (step S905), and the process ends. At step S904, the scenario extracting unit 405 may extract, from the exception scenario information DB 300, exception scenario information corresponding to the external input terminal included in the functional block determined at step S903.

Figure 10:
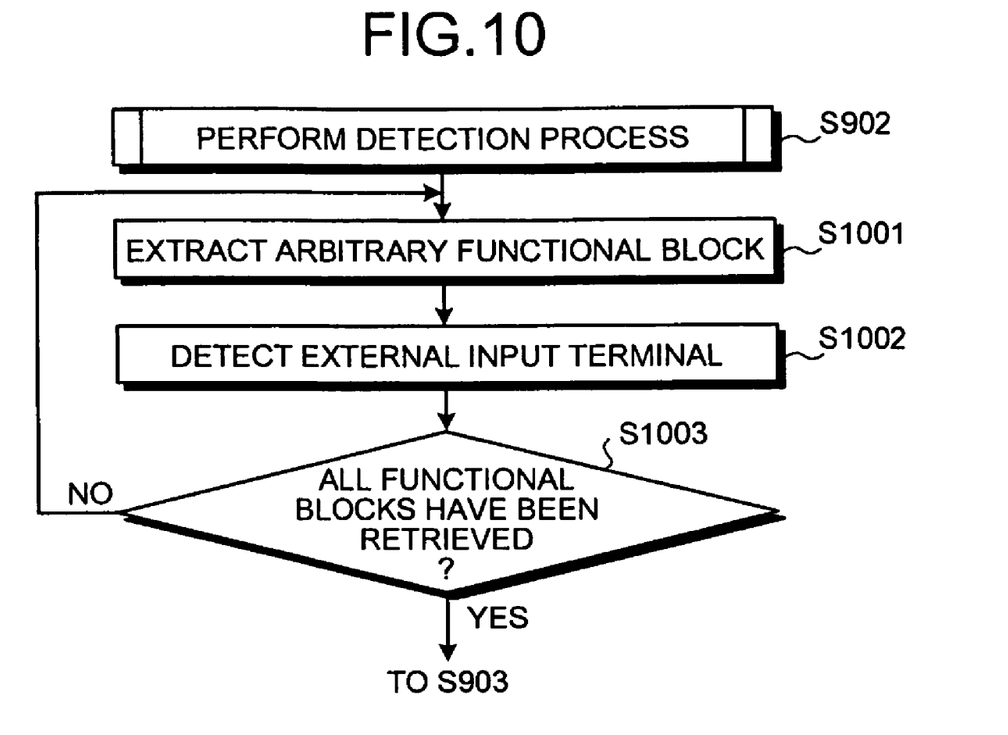
FIG. 10 is a flowchart of a detection process.

FIG. 10 is a flowchart of the detection process at step S902 in FIG. 9. As shown in FIG. 10, the extracting unit 404 extracts an arbitral functional block from the subject circuit 200 based on the implementation description data D input at step S901 (step S1001).

The detecting unit 402 detects an external input terminal in the functional block extracted at step S1001 (step S1002). It is judged whether all of the functional blocks A to C in the subject circuit 200 have been extracted (step S1003). When all of the functional blocks A to C in the subject circuit 200 have not been extracted (step S1003: NO), the process returns to step S1001. When all of the functional blocks A to C in the subject circuit 200 have been extracted (step S1003: YES), the process proceeds to step S903.

According to the embodiment, in the verification of abnormal-event operation of the subject circuit 200, the functional blocks A and C having a high potential for bugs to occur can be automatically determined. As a result, the exception scenarios to be used for the exception scenario verification can be limited to the exception scenarios corresponding to the functional blocks A and C having a high potential for the occurrence of bugs. Hence, the necessary exception scenarios can be effectively narrowed down.

The number of the exception scenarios can be further narrowed down effectively by limiting the exception scenarios to the exception scenarios that correspond to the external input terminals in the functional blocks A and C. Furthermore, as the exception scenario verification on the subject circuit 200 is performed using a reduced number of the exception scenarios, effective logic verification can be executed.

As explained above, according to the embodiment, the vast number of the exception scenarios can be effectively reduced to perform effective logic verification, thereby enabling reduced load on the verification engineer and achieving a shorter verification period.

The verification support method explained in the present embodiment can be implemented by a computer such as a personal computer and a workstation executing a program that is prepared in advance. This program is recorded on a computer-readable recording medium such as a hard disk, a flexible disk, a CD-ROM, an MO, and a DVD, and is executed by being read out from the recording medium by a computer. This program can be a transmission medium that can be distributed through a network such as the Internet.

Furthermore, the verification support apparatus 100 explained above can be implemented by an integrated circuit for particular application such as a standard cell and a structured application specific integrated circuit (ASIC), and a programmable logic device (PLD) such as a field programmable gate array (FPGA). Specifically, for example, the functional units 401 to 406 in the verification support apparatus 100 are defined in HDL description, which is logically synthesized and applied to the ASIC and the PLD, and hence, the verification support apparatus 100 can be manufactured.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-readable, non-transitory medium storing therein a computer program for verifying operation of a circuit, wherein the computer program causes a computer to execute:
   receiving implementation description data of the circuit;
   detecting, based on the implementation description data, a functional block that is in the circuit and includes an external input terminal that receives an external input signal;
   determining, based on a detection result at the detecting, the functional block to verify an abnormal-event operation, the abnormal-event operation being an operation that differs from an operation implementing a function of the circuit;
   extracting, from a pool of exception scenario information for verifying the abnormal-event operation, the exception scenario information concerning the functional block determined at the determining; and
   outputting the exception scenario information extracted at the extracting.

2. The computer-readable, non-transitory medium according to claim 1, wherein the computer program therein further causes the computer to execute
   extracting an arbitrary functional block from the circuit by referring to the implementation description data, wherein
      the detecting includes detecting, in the arbitrary functional block, the external input terminal, and
      the determining includes determining the arbitrary functional block to be the functional block to verify abnormal-event operation if the external input terminal is detected at the detecting.

3. The computer-readable, non-transitory medium according to claim 1, wherein the extracting includes extracting the exception scenario information concerning the external input terminal.

4. A verification support apparatus that verifies operation of a circuit, comprising:
   a receiving unit that receives implementation description data of the circuit;
   a detecting unit that detects, based on the implementation description data, a functional block that is in the circuit and includes an external input terminal that receives an external input signal;
   a determining unit that determines, based on a detection result of the detecting unit, the functional block to verify an abnormal-event operation, the abnormal-event operation being an operation that differs from an operation implementing a function of the circuit;
   an exception scenario extracting unit that extracts, from a pool of exception scenario information for verifying the abnormal-event operation, the exception scenario information concerning the functional block determined by the determining unit; and
   an output unit that outputs the exception scenario information extracted by the exception scenario extracting unit.

5. The verification support apparatus according to claim 4, further comprising
   an extracting unit that extracts an arbitrary functional block from the circuit by referring to the implementation description data, wherein
      the detecting unit detects, in the arbitrary functional block, the external input terminal, and
      the determining unit determines the arbitrary functional block to be the functional block to verify abnormal-event operation if the external input terminal is detected by the detecting unit.

6. The verification support apparatus according to claim 4, wherein the exception scenario extracting unit extracts the exception scenario information concerning the external input terminal.

7. A verification support method of verifying operation of a circuit, comprising:
   receiving implementation description data of the circuit;
   detecting, based on the implementation description data, a functional block that is in the circuit and includes an external input terminal that receives an external input signal;
   determining, by a computer, based on a detection result at the detecting, the functional block to verify an abnormal-event operation, the abnormal-event operation being an operation that differs from an operation implementing a function of the circuit;
   extracting, by a computer, from a pool of exception scenario information for verifying the abnormal-event operation, the exception scenario information concerning the functional block determined at the determining; and
   outputting the exception scenario information extracted at the extracting.

8. The verification support method according to claim 7, further comprising
   extracting an arbitrary functional block from the circuit by referring to the implementation description data, wherein
      the detecting includes detecting, in the arbitrary functional block, the external input terminal, and
      the determining includes determining the arbitrary functional block to be the functional block to verify abnormal-event operation if the external input terminal is detected at the detecting.

9. The verification support method according to claim 7, wherein the extracting includes extracting the exception scenario information concerning the external input terminal.

* * * * *